United States Patent [19]

Kathirgamanathan et al.

[11] Patent Number: 4,937,060

[45] Date of Patent: Jun. 26, 1990

[54] COATED INORGANIC MATERIALS

[75] Inventors: Poopathy Kathirgamanathan, North Harrow; Philip N. Adams, London; Andrew M. Marsh, Hayes; Dilip Shah, Wembley, all of United Kingdom

[73] Assignee: Cookson Group plc, United Kingdom

[21] Appl. No.: 216,296

[22] Filed: Jul. 8, 1988

[51] Int. Cl.$^5$ .............................................. B32B 9/00
[52] U.S. Cl. .................................... 428/403; 428/407
[58] Field of Search .............................. 428/403, 407

[56] References Cited

U.S. PATENT DOCUMENTS 4,818,607 4/1989 Rickborn et al. .................. 428/403

Primary Examiner—William J. Van Balen
Attorney, Agent, or Firm—Watson, Cole, Grindle & Watson

[57] ABSTRACT

An inorganic powdery or granular material which is coated with a coating of an inherently conductive polymeric material, such as a conductive polypyrrole or substituted polypyrrole, a polythiophene or substituted polythiophene, a polyaniline or substituted polyaniline, a polyethylene oxide or an aniline copolymer. The material which is coated is talc, mica, wollastonite, calcium carbonate, aluminium hydroxide, clay or hydroxyapatite.

5 Claims, No Drawings

COATED INORGANIC MATERIALS

The present invention relates to coated inorganic materials, and in particular to the provision of a conductive polymeric coating on inorganic powdery, granular, flaky or fibrous materials.

EP-A-0119030 describes a method of electroplating metals such as silver, copper and nickel onto an inorganic powdery or granular material, the surface of which has first been rendered electrically conductive.

This method suffers from the disadvantage that the surface of the inorganic powdery or granular material must first be rendered electrically conductive before a metal can be electroplated thereon. Furthermore, electroplating is an expensive procedure.

East German Patent No. 238994 discloses an organophilic coloured filler which comprises particles of a clay mineral which are coated with a polymer, such as a homopolymer or copolymer of acrylonitrile. The polymer is heated in order to decompose a part of the polymer matrix, whereby carbon is formed in the matrix which renders the polymer conductive.

We have now developed a coated inorganic powdery granular, flaky or fibrous material which is coated with a conductive polymeric coating and methods for the preparation of this coated material.

Accordingly, the present invention provides an inorganic particulate material which is coated with a coating of an inherently conductive polymeric material.

The term "granular" as used herein is meant to include flaky and fibrous inorganic materials, as well as those which would normally be termed granular.

Any powdery or granular natural mineral or any artificial inorganic powdery or granular material can be used in the present invention. Examples of powdery materials are calcium carbonate, wollastonite, quartz powder, titanium dioxide and alumina. Examples of flaky materials are mica, talc and vermiculite. Examples of fibrous materials are glass fibre, rock wool and ceramic fibre. The use of talc, mica and wollastonite is particular preferred. The inorganic powdery or granular materials which are coated according to the present invention preferably have an average diameter or average length of from 0.1 to 50 micrometers, more preferably 10 to 300 micrometers.

Inorganic powdery or granular materials are commonly added to polymeric materials, either simply as fillers or so as to increase the mechanical strength of the polymer. For example, uncoated talc, mica and wollastonite are used as fillers in polymers such as poly(vinyl chloride), polypropylene, poly(acrylonitrile-butadiene-styrene), etc., at loadings of up to 60% by weight in order to increase impact strength.

Inorganic powdery or granular materials which are coated with a conductive polymeric coating find use not only as fillers for polymeric materials but also as additives to impart electromagnetic shielding or antistatic properties.

Conductive calcium carbonate and conductive aluminium trihydroxide, when compounded into a polymer such as poly(vinyl chloride), polypropylene, a polycarbonate such as Lexan 141R from GEP plastics or poly(ethylene terephthalate), not only impart conductivity but also provide smoke suppressing and flame retarding properties to the polymer.

Furthermore, hydroxy apatite ($Ca_5(PO_4)_3(OH)$) which is used as a stabiliser in poly(vinyl chloride) technology can be made conductive by coating with poly(aniline) polyphosphate which comprises poly(aniline) synthesised in the presence of a polyphosphoric acid with the general formula $H_{n+2}P_nO_{3n+1}$, where n is >1.

Clay is also extensively used as a filler in flooring materials and wall cladding materials and can be made conductive by coating with a conducting polymer such as poly(aniline) polyphosphate.

The conductive polymeric coating is preferably a coating of a polypyrrole or substituted polypyrrole, a polythiophene or substituted polythiophene, a polyaniline or substituted polyaniline, a polyethylene oxide, or an aniline copolymer.

Examples of substituted polypyrroles which may be used in the invention are those which are disclosed in European Patent Application No. 87306134.5.

Examples of substituted polythiophenes which may be used in the invention are disclosed in European Patent Application No. 87306133.7.

Examples of substituted polyanilines which may be used in the present invention are those which comprise repeating units of the general formula:

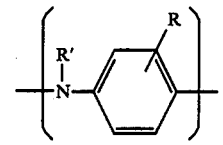

where R is in the ortho-ormeta-position and is $-(CH2_2)_mO(CHR''CH_2)_nOR'''$ where m is 0 or an integer of from 1 to 6, n is an integer of from 1 to 6, R'' is a hydrogen atom or a methyl group and R''' is an alkyl group containing from 1 to 6 carbon atoms, or the group

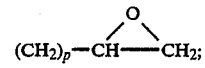

where p is 0 or an integer of from 1 to 6, and R' is hydrogen, $C_{1-6}$ alkyl or aryl, and counterions of the formula X, where X is $Cl^-$, $Br^-$, $SO_4^=$, $BF_4^-$, $PF_6^-$, $H_2PO_3^-$, $H_2PO_4^-$, arylsulphonate, arenedicarboxylate, arenecarboxylate, polystyrene sulphonate, polyacrylate, alkylsulphonate, vinylsulphonate, vinylbenzene sulphonate, cellulose sulphonate, cellulose sulphate or a perfluorinated polyanion.

Examples of aniline copolymers which may be used in the present invention are the copolymers of an aniline monomer of the general formula:

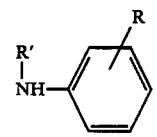

where
R is in the ortho- or meta- position and is hydrogen, $C_{1-18}$ alkyl, $C_{1-6}$ alkoxy, amino, chloro, bromo, sulpho, carboxy, hydroxy or the group

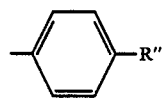

where
R″ is alkyl or aryl; and
R′ is hydrogen, $C_{1-6}$ alkyl or aryl; another aniline monomer of formula I as defined above, the copolymer including counterions X where X is as defined above.

We have also ascertained that for at least some inorganic particulate materials a combination of coatings may be desirable.

For example, calcium carbonate may be coated with a material such as conducting poly(pyrrole), non-conducting calcium p-toluenesulphonate, or any other suitable organic or inorganic material that will withstand the acidic conditions normally employed in the synthesis of poly(aniline).

Inorganic particulate materials which are coated with a combination of coatings, at least one of which is an inherently conductive polymer, are included within the scope of the invention.

The coated inorganic materials of the present invention may be prepared by using an electrochemical polymerization method to form the polymeric coating on the inorganic material.

Accordingly, the present invention includes within its scope a method for the preparation of an inorganic powdery or granular material with a coating of a conductive polymeric material thereon, which method comprises subjecting an appropriate monomer in an aqueous or non-aqueous medium having the inorganic powdery or granular material suspended therein to electrochemical oxidation at an electrode potential which is at least as electropositive as the oxidation potential of the monomer.

In order to coat the inorganic materials it is generally necessary to render them sufficiently conductive (in order to reduce the electrical resistance) by initially coating the materials chemically before the conducting polymers are deposited electrochemically thereon.

By the term "appropriate monomer" as used herein is meant a monomer which can be polymerized to form a conducting polymer.

It will be appreciated by those skilled in the art that the polymers produced by this method include counterions in their structure, and suitable counterions $X^-$, which will generally be provided by an appropriate choice of electrolyte, include chloride, bromide, sulphate, bisulphate, nitrate, tetrafluoroborate, alkylsulphonate, arylsulphonate, arenecarboxylate, alkylcarboxylate, arenedicarboxylate, polystyrenesulphonate, polyacrylate, cellulose sulphonate, cellulose sulphate, anthracenesulphonate, $H_2PO_3^-$, $H_2PO_4^-$, $PF_6^-$, $SbF_6^-$, $AsF_6^-$ or a perfluorinated polyanion.

The electrolyte is chosen so as to provide the counterions as above defined.

The non-aqueous medium is preferably acetonitrile, dichloromethane, chloroform, nitromethane, nitrobenzene, propylene carbonate, dichloroethane, N-methylpyrrolidone, sulpholane, dimethylformamide, dimethylsulphoxide, or a mixture of two or more thereof.

The coated inorganic materials of the present invention may also be prepared by using a chemical polymerization method to form the polymeric coating on the inorganic material.

Accordingly, the present invention furthermore includes within its scope a method for the preparation of an inorganic powdery or granular material with a coating of an inherently conductive polymeric material thereon, which method comprises subjecting an appropriate monomer in an aqueous or non-aqueous medium to oxidation using an oxidant which has a higher oxidation potential than the monomer either in the presence of an acid HX, or a salt thereof to provide the counterions $X^-$, or with the sequential addition of an acid HX or a salt thereof to the oxidised monomer in order to provide the counterions $X^-$.

The oxidation may be carried out in the presence or absence of a catalyst. The choice of oxidant will depend upon the monomer which is to be polymerized. Examples of suitable oxidants are $Ag^I$, $Cu^{II}$, $Ce^{IV}$, $Mo^V$, $Ru^{III}$, $Mn^{III}$, $H_2O_2$, $K_2Cr_2O_7$ and $(NH_4)_2S_2O_8$. The preferred oxidants are $K_2Cr_2O_7$, $(NH_4)_2Cr_2O_7$ and $(NH_4)_2S_2O_8$. The catalyst, if used, may be any transition metal ion, preferred examples of which are $Mo^V$, $Ru^{III}$, and $Mn^{III}$.

The choice of aqueous or non-aqueous medium will depend upon the monomer which is to be oxidised. When the monomer is aniline, or a substituted aniline the polymerization reaction will be carried out in aqueous medium.

In both the chemical and electrochemical coating methods of the invention it is necessary for the inorganic powdery or granular material to be maintained in suspension during the coating operation. This may be achieved by any suitable means, for example by vigorous mechanical stirring.

The coated inorganic powdery or granular materials of the present invention may be used as fillers for polymeric materials such as poly(vinyl chloride), polyethylene, polypropylene, polystyrene, nylon, poly(acrylonitrile-butadienestyrene), poly(ethylene terephthalate), polyester, poly(methyl methacrylate) or poly(ethylene oxide) in an amount of up to about 80% by weight, preferably in an amount of 20 to 40% by weight. These composites have good conductivities and good antistatic properties. They also have an improved impact strength as compared with the unfilled polymeric materials.

The present invention will be further described with reference to the following Examples, in which percentages are by weight unless otherwise stated.

EXAMPLE 1

The preparation of poly(aniline) p-toluenesulphonate coated talc 13.3 g of talc (Luganec 1445, from Durham Chemicals Ltd) was suspended in 100 ml of aqueous 2M p-toluenesulphonic acid with vigorous mechanical stirring. 9.31 g of aniline was added and the stirring continued for a further 10 minutes before ammonium dichromate (5.04 g in 30 ml of water) Was added over a period of 15 minutes. The solution was stirred for a further 4 hours, filtered and dried overnight in vacuo ($10^{-1}$ torr) at 90° C. The yield of poly(aniline)p-toluenesulphonate was 22 g, with a polyaniline content of approximately 39.5%. The bulk conductivity of this coated material was 2.9 S $cm^{-1}$.

EXAMPLES 2 TO 7

The general procedure of Example 1 was repeated for the preparation of poly(aniline)p-toluenesulphonate coated talc, using 9.31 g aniline and 38.05 g p-toluenesulphonic acid in 100 ml $H_2O$; the details of these preparations and the conductivity of the coated talc so prepared are given in Table 1 below.

TABLE 1

| Example | Talc (g) | Oxidant | Yield (g) | Polyaniline content (%) | valdes surface conductivity $S\ cm^{-1}$ | Bulk Conductivity $S\ cm^{-1}$ |
|---|---|---|---|---|---|---|
| 2 | 93.1 | ammonium dichromate 5.04 g in 100 ml. water | 99.6 | 6.5 | $8 \times 10^{-4}$ | $8 \times 10^{-3}$ |
| 3 | 46.76 | ammonium dichromate 5.04 g in 100 ml. water | 55.7 | 16.1 | $2 \times 10^{-2}$ | $2 \times 10^{-1}$ |
| 4 | 18.62 | ammonium persulphate 34.24 g in 30 ml of water | 27.6 | 32.6 | $7.3 \times 10^{-2}$ | $7 \times 10^{-1}$ |
| 5 | 17.30 | ammonium persulphate 34.24 g in 30 ml of water | 26.7 | 35.2 | $8.9 \times 10^{-2}$ | $9 \times 10^{-1}$ |
| 6 | 13.30 | ammonium persulphate 34.24 g in 30 ml of water | 22.0 | 39.5 | $2.9 \times 10^{-1}$ | 3 |
| 7 | 9.39 | ammonium persulphate 34.24 g in 30 ml of water | 18.1 | 48.1 | $2.6 \times 10^{-1}$ | 3 |

EXAMPLE 8

The preparation of poly(pyrrole) p-toluenesulphonate coated talc 10 g of talc was suspended in a 50 ml aqueous solution containing 2.12 g of sodium p-toluenesulphonate with vigorous mechanical stirring. 3.35 g of pyrrole was added and the solution was stirred for 30 minutes. The temperature of the mixture was maintained below 30° C. by immersing the reaction vessel in an ice bath. 2.28 g of ammonium persulphate in 8 ml of water was added slowly thereto, whilst still maintaining vigorous stirring. After 30 minutes of further stirring, the black product obtained was filtered at suction. The product was then suspended in 100 ml of acetone, filtered at suction and dried in vacuo ($10^{-1}$ torr) at 40° C. for 12 hours. The bulk conductivity of the product was 3.7 S $cm^{-1}$.

EXAMPLE 9

The preparation of poly(aniline) p-toluenesulphonate coated wollastonite 23.28 g of wollastonite coated with an aminosilane was suspended in a 100 ml aqueous solution containing p-toluenesulphonic acid (38.05 g) and aniline (9.3 g) with vigorous mechanical stirring. The slow addition thereto of ammonium persulphate solution (34.24 g in 100 ml) caused rapid oxidation of the aniline and a visoous suspension of poly(aniline) coated wollastonite was formed. The mixture was stirred for a further three hours before filtration. The product was filtered washed with water and dried at 90° C. in vacuo ($10^{-1}$ torr). The yield of poly(aniline) p-toluenesulphonate coated wollastonite was 27.80 g. The polyaniline content of this product was 16.3%. The volume conductivity of a compacted pellet of this material was $1 \times 10^{-2}$ S $cm^{-1}$.

EXAMPLE 10

The preparation of poly(pyrrole) p-toluenesulphonate coated wollastonite 60 g of aminosilane coated wollastonite was suspended in an aqueous solution (180 ml) containing 59.94 g of sodium p-toluenesulphonate with vigorous mechanical stirring. 36 g of pyrrole was then added thereto, followed by 50 ml of water. The solution was cooled in an ice bath and ammonium persulphate (91.8 g in 300 ml water) slowly added with continued stirring. The solution was stirred for a further three hours after the addition of ammonium persulphate. The black powdery poly(pyrrole) coated wollastonite product was filtered at suction, washed with water, then with acetone and dried at 40° C. in vacuo ($10^{-1}$ torr) A yield of 127 g of poly(pyrrole) p-toluenesulphonate coated wollastonite was obtained. The product had a bulk conductivity of 5.6 S $cm^{-1}$.

EXAMPLE 11

The preparation of poly(aniline) p-toluenesulphonate coated mica 23.3 g of calcined mica was suspended in a 100 ml aqueous solution containing p-toluenesulphonic acid (19.02 g) and aniline (9.31 g) with vigorous mechanical stirring. 22.82 g of ammonium persulphate in 100 ml of water was added slowly thereto with a vigorous stirring. The temperature of the reaction mixture was maintained below 40° C. by immersing the reaction vessel in an ice cooled bath. The reaction mixture was stirred for a further 4 hours. The black powdery product obtained was filtered at suction, washed with water and dried at 40° C. in vacuo ($10^{-1}$ torr). 34 g of poly(aniline) p-toluenesulphonate coated mica was obtained. The poly(aniline) content of this product was 31.5%. The product has a volume conductivity of 1.6 S $cm^{-1}$.

EXAMPLE 12

The preparation of poly(pyrrole) p-toluenesulphonate coated mica 10 g of calcined mica was suspended in 35 ml of an aqueous solution containing 2.12 g of sodium p-toluenesulphonate with vigorous stirring. 3.35 g of pyrrole was added thereto and the stirring continued for 1 hour. Ammonium persulphate (2.28 g in 10 ml of water) was added slowly over a period of 90 seconds. A further 75 ml of water was also added. The mixture was stirred for a further 1½ hours. The mixture was then filtered at suction, washed with 1200 ml of water and the powder suspended in 100 ml of acetone for 80 minutes with stirring.

The solution was filtered again at suction and dried in vacuo ($10^{-1}$ torr) at 40° C. 10.4 g of a black poly(pyrrole) coated mica powder was obtained. This powder had a metallic lustre and the volume conductivity of a compacted disc was 1.2 S $cm^{-1}$.

EXAMPLE 13

Formulation of conductive poly(vinyl chloride) composite using poly(aniline) p-toluenesulphonate coated talc A masterbatch of poly(vinyl chloride) was prepared as follows

|  | Parts by weight |
| --- | --- |
| Poly(vinyl chloride) (ICI, Corvic 567/105) | 100 |
| Dioctyl phthalate | 50 |
| Tribasic lead sulphate | 5 |
| Calcium stearate | 0.5 |

The poly(aniline) p-toluenesulphonate coated talc was premixed with the poly(vinyl chloride) masterbatch at the desired loading levels and processed at 150° C. on a two-roll mill into thin sheets with thicknesses ranging from 0.5 to 2 mm. These thin sheets were hot pressed at a temperature of about 150° C. at a pressure of 30 bar for 1 minute, then a pressure of 100–120 bar for 1 minute, after which the pressure was released to zero. A pressure of 120 bar was reapplied for a further 1 minute. The pressure was then released and the "composite" placed in cooling platens. A pressure of 120 bar was applied until the composite reached room temperature.

Conductivity measurements were carried out on these sheets using an annular ring electrode or a linear four-probe electrode. The conductivity measurements are given in Table 2 below.

TABLE 2

| Loading in poly(vinyl chloride) (% by weight) | $\sigma$surface/$S\square$ | $\sigma$volume/$S\,cm^{-1}$ |
| --- | --- | --- |
| 40 | $3.8 \times 10^{-6}$ | $2.1 \times 10^{-5}$ |
| 50 | $2.9 \times 10^{-5}$ | $1.8 \times 10^{-4}$ |

EXAMPLE 14

Using a similar technique to that described in Example 13, the poly(pyrrole)p-toluenesulphonate coated wollastonite prepared according to Example 10 was used as a filler for poly(vinyl chloride).

The composite produced at a 40% by weight loading in the poly(vinyl chloride) had a surface conductivity of $5\times10^{-8}$ $S\square$.

EXAMPLE 15

Preparation of conductive calcium carbonate 100 g of calcium carbonate (Polycarb 60S - English China Clay) was suspended in an aqueous solution (300 ml) containing 94.8 g (0.447 moles) of sodium p-toluenesulphonate with vigorous stirring. 60 g (0.89 moles) of pyrrole was then added and stirring continued for 75 minutes. Ammonium persulphate 153 g (0.67 moles) in 500 ml of water was added slowly over 15 minutes and stirring was continued for a further 4 hours. The solution was then filtered at suction, washed with 8 liters of deionised water and dried in vacuo ($10^{-1}$ torr) at 100° C. for 12 hours. The fine black powder obtained (154 g) had a volume conductivity of $5.7\pm1\times10^{-6}$ S $cm^{-1}$.

Aniline (82.3 g, 0.884 moles) was added to 150 g of the poly(pyrrole) coated calcium carbonate powder and then p-toluenesulphonic acid (336.1 g, 1.765 moles in 1.43 liters of water) was added slowly and the mixture stirred vigorously for 15 minutes. Some gas evolution was noted, possibly because of incomplete coverage of poly(pyrrole) or penetration of the acid through the pores of the poly(pyrrole) coating. 201.6 g (0.884 moles) of ammonium persulphate in 681 ml of water was added slowly over 20 minutes when the reaction mixture slowly turned to dark green blue. After 4 hours of continued stirring, the solution was filtered at suction, washed with 9 liters of deionised water and dried in vacuo (10 torr) at 100° C. for 12 hours. The light green powder had a volume conductivity of $(0.39\pm0.01)$ S $cm^{-1}$. This conductive calcium carbonate was loaded into poly(vinyl chloride) (PVC) at a volume loading of 36.8% [in a formulation comprising PVC (100 parts), dioctyl phthalate (50 parts per hundred resin), tribasic lead sulphate (5 parts per hundred resin) and calcium stearate (0.5 parts per hundred resin)] and a conductive composite with a volume conductivity of $3\times10^{-2}$ S $cm^{-1}$ was obtained.

EXAMPLE 16

Preparation of conductive calcium carbonate 240 ml of 0.01M p-toluenesulphonic acid was slowly added to 60 g of calcium carbonate (Polcarb 60S - English China Clay) and stirred for 1 hour so that only the surface of the calcium carbonate particles reacted with the p-toluenesulphonic acid and formed an insoluble coating of calcium p-toluenesulphonate. The solution was filtered at suction and 50 g of the solid was transferred to a 0.4M aniline solution (740 ml) and the solution was stirred for a further 1.5 hours after which p-toluenesulphonic acid (3M, 355 ml) was added slowly with continued vigorous stirring. Ammonium persulphate (1M, 300 ml) was then added over a 10 minute period. The reaction took approximately 15 minutes to go to completion when a dark green solution was produced. The solution was filtered at suction, washed with 8 liters of deionised water and dried at 100° C. in vacuo ($10^{-1}$ torr). The green powder (58.6 g) had a volume conductivity of $0.46 \pm 0.10$ S cm$^{-1}$.

EXAMPLE 17

Some further variations of the method of synthesis of conductive poly(aniline) coated calcium carbonate, using a poly(pyrrole) protective coating layer on the particles, as described in Example 15, are given in Tables 3A and 3B below.

Synthesis of poly(pyrrole) coated calcium carbonate

TABLE 3A

| Run No. | CaCO$_3$ (g) (Polycarb 60S) | Pyrrole (moles) | NaPTS (moles) | S$_2$O$_8^{2-}$ (moles) | $\sigma$volume/ S cm$^{-1}$ |
|---|---|---|---|---|---|
| 1 | 200 | 1.0 | 0.20 | 0.20 | $1.75 \times 10^{-4}$ |
| 2 | 100 | 0.895 | 0.447 | 0.670 | $3.12 \times 10^{-5}$ |
| 3 | 20 | 0.063 | 0.031 | 0.047 | $6.4 \times 10^{-6}$ |
| 4 | 20 | 0.011 | 0.005 | 0.008 | $<10^{-8}$ |
| 5 | 100 | 0.053 | 0.026 | 0.039 | $<10^{-8}$ |
| 6 | 100 | 0.316 | 0.157 | 0.236 | $3.73 \times 10^{-4}$ |

Synthesis of poly(aniline) coated calcium carbonate from the poly(pyrrole) coated calcium carbonate prepared according to Table 3A

TABLE 3B (The approximate poly(aniline) content in the final product is 40% unless otherwise indicated)

| Product from Run No. | Molar Ratio Aniline | HPTS | S$_2$O$_8^{2-}$ | $\sigma$volume/ S cm$^{-1}$ |
|---|---|---|---|---|
| 1 | 1 | 1.5 | 1 | $<10^{-8}$ |
| 2 | 1 | 3 | 1 | 0.20 |
| 3 | 1 | 2 | 1 | $3.54 \times 10^{-4}$ |
| 4 | 1 | 2 | 1 | $3.34 \times 10^{-4}$ |
| 5 | 1 | 3 | 1 | $6.88 \times 10^{-4}$ |
| 6 | 1 | 5 | 1 | 0.128 |

Footnotes to Tables 3A and 3B
NaPTS = Sodium p-tolunenesulphonate
S$_2$O$_8^{2-}$ = Persulphate [from (NH$_4$)$_2$S$_2$O$_8$]
HPTS = p-tolunesulphonic acid.

EXAMPLE 18

Some other variations in the preparation of direct poly(aniline) p-toluenesulphonate coated calcium carbonate, according to the general method of Example 16, are given in Table 4 below.

TABLE 4

(Polyaniline content of the product is approximately 40%)

| Run No. | Molar ratio Aniline | HPTS | S$_2$O$_8^{2-}$ | $\sigma$volume/ S cm$^{-1}$ | Remarks |
|---|---|---|---|---|---|
| 7 | 1.0 | 2.0 | 1.0 | $<10^{-8}$ | a |
| 8 | 1.0 | 5.0 | 1.0 | $3.13 \times 10^{-2}$ | a |
| 9 | 1.0 | 5.0 | 1.0 | $1.02 \times 10^{-3}$ | b |
| 10 | 1.0 | 3.6 | 1.0 | 0.463 | b |

Footnotes to Table 4
a = Reagents were added in the following order CaCO$_3$/aniline/acid/oxidant
b = CaCO$_3$ was initially coated with calcium p-toluenesulphonate and poly(aniline) coated thereover as follows:
HPTS (0.01 M) was reacted with CaCO$_3$ for 1 hour, then the reagents were added in the order aniline/acid/oxidant.

EXAMPLE 19

Preparation of poly(pyrrole)p-toluenesulphonate coated aluminum hydroxide 400 g of aluminium hydroxide (BACO FRF 10 - surface area 0.5 m$^2$/g from BA Chemicals Ltd.) was suspended in an aqueous solution (600 ml) containing 189.6 g (0.536 moles) of sodium p-toluenesulphonate with vigorous mechanical stirring. 120 g of pyrrole was added and the stirring continued for a further fifteen minutes when 306 g (1.338 moles) ammonium persulphate in 1000 ml of water was added slowly over a period of 22 minutes with continued stirring. After stirring the reaction mixture for 3 hours, the mixture was filtered and the black powder formed was washed with 12 liters of water and dried at 100° C. in vacuo. The fine black powder (487.2 g) had a volume conductivity of 2.15 S cm$^{-1}$.

Details of other preparations according to this general method are given in Table 5 below.

TABLE 5

| Run No. | Aluminium trihydroxide (g) | Pyrrole (moles) | NAPTS (moles) | Oxidant (moles) | $\sigma$volume/ S cm$^{-1}$ |
|---|---|---|---|---|---|
| 11 | 40 (c) | 0.169 | 0.054 | 0.134 | 0.31 |
| 12 | 400 (c) | 0.688 | 0.536 | 1.338 | 2.15 |
| 13 | 40 g (d) | 0.169 | 0.054 | 0.134 | 1.17 |
| 14 | 400 (d) | 1.688 | 0.536 | 1.338 | 1.52 |

Footnotes to Table 5:
(c) = BACO FRF-10 - surface area 0.5 m$^2$/g
(d) = BACO SF-4 - surface area 4 m$^2$/g

EXAMPLE 20

Preparation of poly(aniline)p-toluenesulphonate coated aluminium trihydroxide

Aluminium trihydroxide (BACO FRF10, 200 g) was added to 1M p-toluenesulphonic acid (1.18 liters) with vigorous mechanical stirring. Aniline (109.7 g) was added and the stirring continued for a further 15 minutes. The white precipitate formed initially redissolved on addition of ammonium persulphate (1M, 1.18 liters) over a period of 30 minutes. The reaction vessel was immersed in an ice bath throughout the whole synthesis. The solution turned white, light brown, dark brown and then green. The reaction mixture was stirred for 4 hours before it was filtered at suction, washed with 12 liters of water and dried at 100° C. in vacuo. The light green powder (312 g) had a volume conductivity of 0.36 S cm$^{-1}$.

Details of other preparation according to this general method are given in Table 6 below.

TABLE 6

| Run No. | Aluminium trihydroxide (g) | Molar ratio Aniline | Acid | Oxidant | $\sigma$volume/ S cm$^{-1}$ |
|---|---|---|---|---|---|
| 15 | 10 (c) | 1 | 1 | 1 | $1.46 \times 10^{-2}$ |
| 16 | 10 (c) | 1 | 1.5 | 1 | $1.92 \times 10^{-2}$ |
| 17 | 200 (c) | 1 | 1 | 1 | 0.36 |
| 18 | 10 (d) | 1 | 1 | 1 | $2.19 \times 10^{-2}$ |
| 19 | 200 (d) | 1 | 1 | 1 | 0.208 | k = BACO FRF-10 - surface area 0.5 m$^2$/g
l = BACO SF4 - surface area 4 m$^2$/g

EXAMPLE 21

Preparation of poly(aniline)/poly(pyrrole) coated aluminium trihydroxide

Poly(pyrrole) coated aluminium hydroxide was prepared according to the procedure described in Example 20 where the aluminium hydroxide is replaced by poly(pyrrole) coated aluminium hydroxide. The experimental details are summarized in Table 7.

TABLE 7

| Run No. | Aluminum trihydroxide | Pyrrole (moles) | NaPTs (moles) | $S_2O_8^{-2}$ (moles) | 94 volume/ S cm$^{-1}$ | Molar Ratio Aniline | Molar Ratio HPTS | Molar Ratio $S_2O_8^{-2}$ | $\sigma$ volume/ S cm$^{-1}$ |
|---|---|---|---|---|---|---|---|---|---|
| 20 | 400 g k | 1.688 | 0.536 | 1.338 | 2.15 | 1 | 1 | 1 | 0.902 |
| 21 | 40 g l  | 0.169 | 0.054 | 0.135 | 1.17 | 1 | 1 | 1 | 0.675 | c = BACO FRF-10 - surface area 0.5 m$^2$/g
d = BACO SF4 - surface area 4 m$^2$/g

EXAMPLE 22

Preparation of poly(aniline) polyphosphate coated hydroxyapatite 9.31 g of aniline was dissolved in 12.2 g of polyphosphoric acid (105 Conphos, Albright and Wilson) in 100 ml of water and stirred for 5 minutes until a clear solution was obtained. 15 g of hydroxy apatite was then added and ammonium persulphate (22.82 g in 80 ml of water) added slowly. The reaction mixture turned to pale green, grey and then dark blue over a 15 minute period. The solution was filtered at suction after stirring for 4 hours and washed with a copious amount of deionised water and dried at 100° C. in vacuo. The dark blue powder (17.3 g) had a volume conductivity of $1.48 \times 10^{-4}$ S cm$^{-1}$.

EXAMPLE 23

Preparation of poly(aniline) polyphosphate coated clay 170.5 g of clay (Polestar 501, English China Clay) was suspended in a 1 liter solution containing 142.4 g of polyphosphoric acid. 93.13 g of aniline was added and stirred to give a creamy solution. The oxidant, ammonium persulphate (228.2 g in 800 ml of water) was added over a 10 minute period. A slow colour change from white, to pale green (15 minutes), to turquoise (15 minutes) and finally to dark blue occurred in 2 minutes. The reaction vessel was always maintained in an ice bath.

After stirring for 2½ hours, the mixture was filtered at suction washed with a copious amount of deionised water, and dried at 100° C. in vacuo. The blue powder (279.8 g) had a volume conductivity of 0.79 S cm$^{-1}$.

The above reaction was carried out at various acidities and the conductivities obtained under those conditions are listed below in Table 8.

TABLE 8

| Run No. | Molar Ratio [Polyphosphoric acid]/[Aniline] | $\sigma^{volume}$/S cm$^{-1}$ |
|---|---|---|
| 22 | 0.50 | 0.07 |
| 23 | 0.60 | 0.51 |
| 24 | 0.65 | 0.53 |
| 25 | 0.70 | 1.42 |
| 26 | 0.8  | 0.79 |
| 27 | 1.0  | 1.05 |

EXAMPLE 24

Poly(ethylene oxide) coated talc

To 20 g of poly(ethylene oxide) dissolved in 400 ml of water, 10 g of p-toluenesulphonic acid was added. 83 g of talc was then added and the mixture was heated to 100° C. for 2 hours, cooled to room temperature, filtered at suction, washed with deionised water and dried at 100° C. in vacuo. The white powder (78 g) produced had a volume conductivity of $7.6 \times 10^{-7}$ S cm$^{-1}$.

EXAMPLE 25

Poly(3-methylthiophene) coated talc 9.8 g of 3-methylthiophene was added to 15 g of talc in 10 g of acetonitrile and the mixture stirred vigorously. 4.67 g of nitrosonium tetrafluoroborate (NOBF$_4$) in 200 g of acetonitrile was slowly added thereto. The solution turned dark brown and was stirred for 16 hours. At the end of this time, the dark brown powder produced was filtered, washed with water and dried in vacuo at 100° C. The dark brown powder (19.52 g) had a volume conductivity of $1.5 \times 10^{-7}$ S cm$^{-1}$.

EXAMPLE 26

Poly(m-toluidine) coated talc 90 g of talc was added to a solution of p-toluenesulphonic acid (142.7 g in 600 ml of water) and the mixture stirred vigorously. On addition of m-toluidine (53.6 g) a white precipitate was formed which was broken up by vigorous stirring. The solution was warmed up to 50° C., ammonium persulphate (114.1 g in 400 ml of water) was added slowly and the temperature rose to 80° C. The heating was stopped and the reaction mixture stirred for a further three hours before it was filtered, washed with water and dried in vacuo at 90° C. The volume conductivity of the grey green powder produced (134.6 g) was $1.8 \times 10^{-4}$ S cm$^{-1}$.

EXAMPLE 27

Poly(3-methyl thiophene) coated calcium carbonate 30 g of calcium carbonate was suspended in a solution of 3 g of 3-methylthiophene and 2 g of MoCl in 250 ml of toluene by vigorous mechanical stirring. The solution was maintained at 50° C. for 24 hours before it was filtered, washed with toluene, an acetone/water mixture and finally with water and then dried in vacuo at 100° C. for 6 hours. The light orange powder (31 g) had a volume conductivity of $1.4 \times 10^{-7}$ S cm$^{-1}$.

EXAMPLE 28

Co-poly[(o-toluidine)[(o-ethylaniline)]p-toluenesulphonate coated talc 8.25 g of talc was added to a 60 ml solution containing 11.4 g of p-toluenesulphonic acid The addition of o-toluidine (2.7 g) and o-ethylaniline (3.0 g) with stirring produced a dense pale brown precipitate which was broken up on further vigorous stirring. The suspension was heated to 40° C. and an oxidant solution compirising 11.41 g ammonium persulphate in 40 ml of water was added. The solution turned dark blue and the solution was stirred for a further two hours, filtered, washed with washed and dried in vacuo at 90° C. The dark greenish-blue powder produced had a volume conductivity of $6.8 \times 10^{-6}$ S cm$^{-1}$.

EXAMPLE 29

501.4 g Of talc was suspended in a solution (275 ml) containing 104.63 g of p-toluenesulphonic acid. 46.6 g of aniline was added thereto and the solution was stirred vigorously. Ammonium persulphate (114.1 g in 300 ml of water) was added slowly and the reaction was stirred for a further period of three hours before it was filtered, washed with water and dried at 100° C. in vacuo for 12 hours. The light green powder so produced (532 g) had a poly(aniline) p-toluenesulphonate content of 5.8% by weight and a volume conductivity of $3.34 \times 10^{-3}$ S cm$^{-1}$.

100 g of the above poly(aniline) coated talc was resuspended in one liter of an aqueous solution which was 0.5M in p-toluenesulphonic acid and 0.1M in aniline.

Two circular plate nickel electrodes served at the anode and cathode. The solution was agitated with mechanical stirring. The electrolysis (current density=1.6 mA cm$^{-2}$) was carried out for three hours and the solution was filtered at suction, washed with water and the dark green powder dried in vacuo at 100° C. for 12 hours. The dark green powder produced (yield=1005 g) had a volume conductivity of $1.4 \times 10^{-2}$ S cm$^{-1}$. A 4.2 fold improvement in conductivity was obtained for a small increase of poly(aniline) content of from 5.8% to 6.3% by weight.

We claim:

1. An inorganic powdery or granular material which is coated with a coating of an inherently conductive polymeric material.

2. An inorganic powdery or granular material according to claim 1 which is coated with a conductive polymeric material selected from the group consisting of a polypyrrole, a substituted polypyrrole, a polythiophene, a substituted polythiophene, a polyaniline, a substituted polyaniline, a polyethylene oxide and an aniline copolymer.

3. An inorganic powdery or granular material according to in claim 1 wherein the material which is coated is selected from the group consisting of talc, mica, wollastonite, calcium carbonate, aluminium hydroxide, clay and hydroxyapatite.

4. An inorganic powdery or granular material according to claim 1 wherein the inorganic powdery or granular material has an average diameter or average length in the range of from 0.1 to 500 micrometers, prior to coating with the conductive polymeric material.

5. An inorganic powdery or granular material according to claim 1 which is coated with a combination of coatings, at least one of which is an inherently conductive polymeric material.

* * * * *